Figure 1:
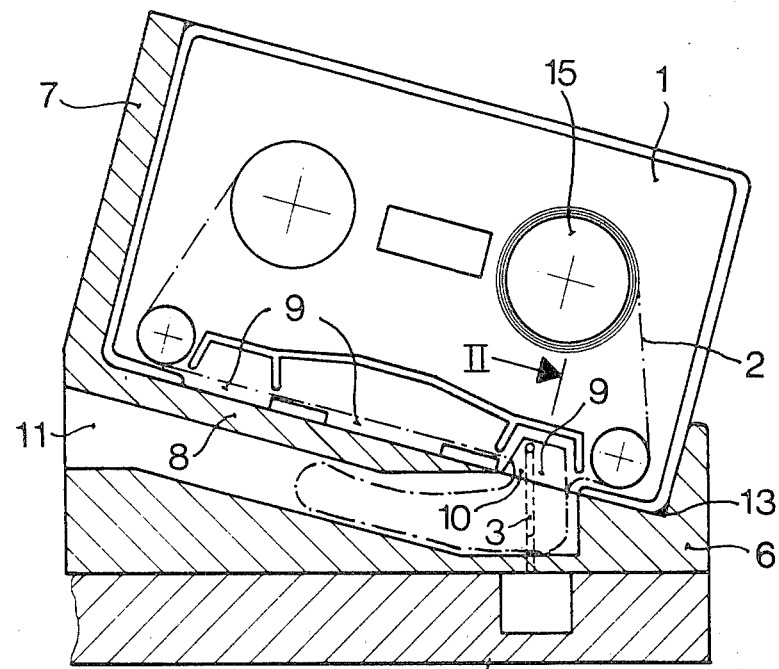

United States Patent [19]

Schoettle et al.

[11] 4,210,266
[45] Jul. 1, 1980

[54] DEVICE FOR EJECTING A LOOP OF LEADER TAPE FROM A MAGNETIC TAPE CASSETTE

[75] Inventors: Klaus Schoettle, Heidelberg; Peter Dobler, Ludwigshafen; Lothar Gliniorz, Frankenthal; Dieter Gaiser, Rheinau-Diersheim; Helmut Lewin, Bobenheim-Roxheim, all of Fed. Rep. of Germany

[73] Assignee: BASF Aktiengesellschaft, Ludwigshafen, Fed. Rep. of Germany

[21] Appl. No.: 897,094

[22] Filed: Apr. 17, 1978

[30] Foreign Application Priority Data

Apr. 30, 1977 [DE] Fed. Rep. of Germany ....... 2719460

[51] Int. Cl.² .................... B65H 17/32; B65H 17/42
[52] U.S. Cl. ........................ 226/97; 226/91; 226/113; 242/56 R
[58] Field of Search ............... 226/91, 97, 113, 118; 242/56 R; 360/85

[56] References Cited

U.S. PATENT DOCUMENTS

| 3,814,343 | 6/1974 | Bennett et al. | 242/56 R |
| 3,888,480 | 6/1975 | Bagozzi | 242/56 R |
| 4,136,838 | 1/1979 | Bosco | 242/56 R |

*Primary Examiner*—Stanley N. Gilreath
*Attorney, Agent, or Firm*—Keil & Witherspoon

[57] ABSTRACT

A device for ejecting a loop of leader tape from a magnetic tape cassette, in which a portion of the leader tape is blown out of the cassette so as to form a loop, by means of a stream of air issuing from at least one nozzle which is connected to a source of pressurized air and projects into one of the apertures in the front wall of the cassette which is located in a holder.

5 Claims, 4 Drawing Figures

DEVICE FOR EJECTING A LOOP OF LEADER TAPE FROM A MAGNETIC TAPE CASSETTE

This invention relates to a device for ejecting a portion of the leader tape from a magnetic tape cassette to form a loop.

Processes and apparatus in which empty cassettes are first produced have been disclosed for the production of magnetic tape cassettes, e.g. compact cassettes. Such empty cassettes contain, except for the magnetic tape, all the components of the cassette, including the hubs, to each of which one end of a leader tape is fastened. In a further stage of manufacture, the magnetic tape, after the leader tape has been cut in two, is spliced to the two discrete leaders and wound into the cassette.

Mechanical apparatus for loading cassettes with magnetic tape are known which comprise cutting means, which are actuatable in a controlled manner, for severing the leader tape and the magnetic tape, as well as tape supports on which the tape ends are spliced together by means of strips of adhesive tape, with the aid of a device which is also actuatable in a controlled manner.

A disadvantage of these apparatus is that the leader tape in the cassettes has to be pulled out of one of the openings in the front wall of the cassette by hand using an auxiliary tool, so that it can be placed on the tape supports of the spicing station.

It is therefore an object of the present invention to provide a device by means of which withdrawal of a portion of the leader tape from a magnetic tape cassette to form a loop can be performed mechanically like all the other manufacturing steps.

This object is achieved according to the invention by a device into which the magnetic tape cassette is inserted and which is provided with at least one nozzle which, upon insertion of the magnetic tape cassette, enters one of the openings in the front wall of the cassette to such a depth that the nozzle orifice is located behind the leader tape. When the nozzle is connected to a source of pressurized gas, a portion of the leader tape is blown out of the cassette to form a loop which enters a channel leading to a splicing station. Here, the leader tape, each end of which is connected to a hub, is cut into two discrete leaders, one end of the magnetic tape to be wound into the cassette is spliced to one leader, a given length of magnetic tape is wound into the cassette, the magnetic tape is then severed and the trailing end of the given length of magnetic tape is spliced to the other leader and wound completely into the cassette.

The device of the invention offers the advantage that withdrawal of the leader tape from the magnetic tape cassette for the purpose of forming a loop can be performed mechanically. The entire operation of splicing the magnetic tape to the leader tape and of winding it into the cassette is therefore fully automated, the device being both reliable and fast in operation. Its action is powerful enough to introduce the leader tape into the tape supports of an adjoining splicing station.

Figure 2:
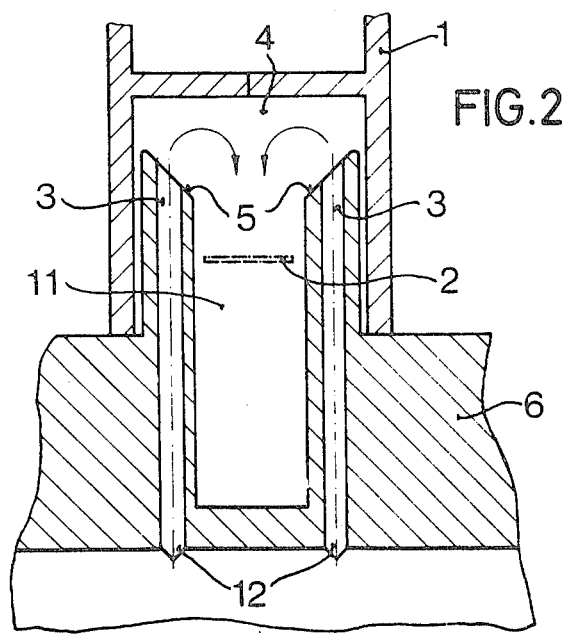
Figure 2A:
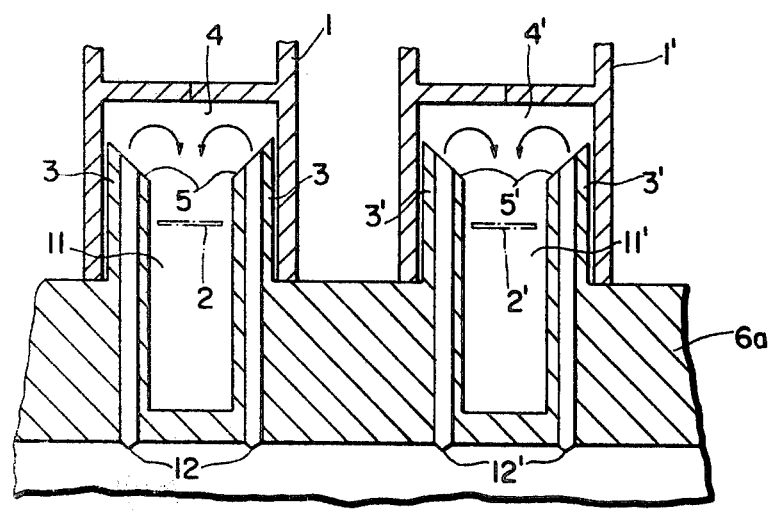
Figure 3:
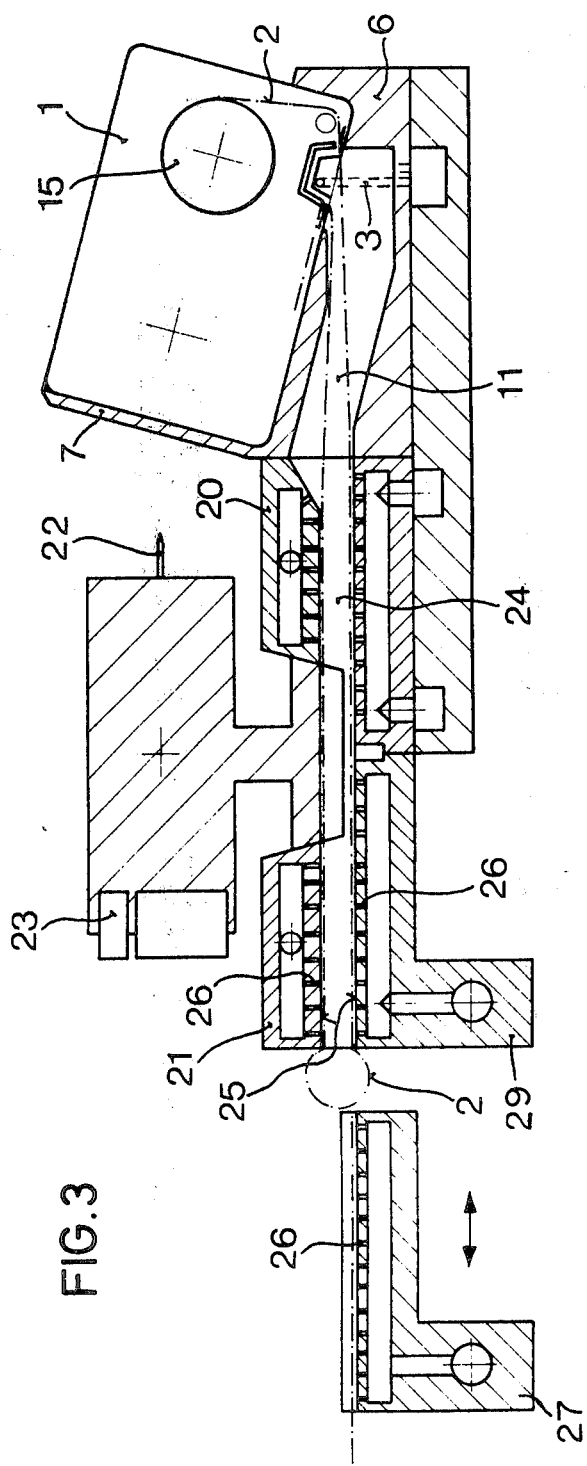

Further details of the invention are disclosed in the following description of one embodiment of the device illustrated in the accompanying drawings, in which FIG. 1 shows the device of the invention diagrammatically in longitudinal section, FIG. 2 is a diagrammatic cross-sectional view of the device of FIG. 1 along the line II—II, and FIG. 2a is a cross sectional view similar to that of FIG. 2, except showing the case in which the device of the invention is designed to accommodate a plurality of cassettes simultaneously, FIG. 3 shows diagrammatically, in longitudinal section, the device of FIG. 1 with an adjacent splicing station.

As shown in FIG. 1, the principle of construction is based on the fact that the leader tape is blown out of one of the apertures in the front wall of the the magnetic tape cassette 1 (hereinafter referred to as "cassette"). This is achieved by raising the pressure in the space behind the leader tape 2 to above atmospheric. For this purpose, two oppositely situated nozzles 3 are used which project into this space 4 to the right and to the left of, and past, the leader tape 2 (of. FIG. 2). Of course only one nozzle can be provided, but its action on the leader tape is less effective and uneven. The nozzle 3 which, for better guidance of the injected stream of air, which may be replaced by another suitable gas if desired, are bevelled at the upper end 5 are either inserted in bores in base 6 or machined out of the base itself. As can be seen from FIG. 2, they form projections over which one of the apertures 9 in the front wall of the cassette is placed when the cassette is inserted in the holder 7. The holder 7 may either consist of a frame or magazine placed upon the base 6 or, as shown in FIG. 1, be in the form of a recess 13 in the base 6, which corresponds to the contours of the cassette. If the holder 7 is provided with a continuous surface 8 for supporting the cassette wall with the apertures 9, an opening 10 must be provided to allow the leader tape 2 to enter channel 11 which is in the form of a bore and runs below the holder 7 for the cassette 1 in the direction of the longitudinal axis of the base 6. When a magazine is used, the channel 11 is advantageously milled as a groove in the base 6, which groove is covered by the bottom of the magazine.

The diameter of the bore 12 in the nozzles 3 is from 0.5 mm to 3.0 mm, and preferably from 1.2 mm to 2.0 mm. The nozzles are connected to a source of pressurized air (not shown in the drawing) via conventional controllable valves. The pressure to be employed is between 1.5 and 15 bars, preferably between 3 and 6 bars. Each nozzle may be provided with a plurality of bores 12 or a slot-shaped channel.

The material of construction of the base 6 is preferably a metal or a plastics material, especially a light metal alloy which can be cast or injection-molded or a transparent plastics material, such as an epoxy resin, an acrylate resin, polystyrene, a polystyrene-acrylonitrile copolymer and a polycarbonate. The latter materials have the advantage that the position of the ejected loop of leader tape inside the device can be easily ascertained visually.

In the interests of economic employment of the device of the invention, it is also possible to provide a plurality of the above-described arrangements in juxtaposition in a larger base, the nozzles being connected to a manifold. The cassettes in this case are arranged side by side and parallel with one another in individual holders. FIG. 2a is a cross sectional view similar to that of FIG. 2 but it applies to the aforementioned case in which the device of the invention is designed to accommodate a plurality of cassettes simultaneously, the base designated 6a in FIG. 2a in this instance being of a correspondingly larger size. Otherwise, in FIG. 2a the same reference numerals have been used as in FIG. 2 except that those pertaining to the second cassette have been primed.

In practice, the above-described device expecially channel 11, is designed in such a way that a splicing station consisting of a stationary tape holder 29 and displaceable tape holders 20, 21, 27 and of cutting means 22 and a splicing tape dispenser 23 can be arranged adjacent thereto (of. FIG. 3). This splicing station is also provided with a channel 24 which communicates with channel 11 of the above-described device and whose upper and lower surfaces are provided with tape supports 25. To hold the tapes in the tape supports 25, the latter are provided with bores 26 which can be temporarily connected to a source of vacuum. However, such a splicing station does not form part of the present invention and is therefore not described here in further detail.

As pointed out above, ejection of a loop of leader tape 2 is effected by the introduction of pressurized air into the space in the cassette behind the leader tape 2. The length of tape blown out in this way, especially when the device of the invention is employed in conjunction with the above-described splicing station, is controllable if conventional drive means (not shown in the drawings) are provided which engage the hub 15 from which the leader tape is unwound. By controlling the drive means, the number of revolutions of the hub 15 and hence the length of leader tape to be ejected can be determined.

While the device of the invention is primarily intended for ejecting a loop of leader tape from a magnetic tape cassette, it can also be used to perform the same operation on other tape-like materials, for example to eject a loop of photographic film from a film cassette provided the holder is modified to take the film cassette and the arrangement of nozzles and the pneumatic pressure to be applied are adapted to suit the film material.

We claim:

1. A device for ejecting a portion of the leader tape from a magnetic tape cassette to form a loop, said cassette having a front wall with openings through one of which said leader is ejected, said device comprising: a relatively stationary holder for said cassette, and, carried by said holder, at least one nozzle which, as the cassette is placed on the holder, projects from the side of said holder facing said front wall, into said cassette through one of said openings and laterally of, and to a point past, said leader so that, upon connection of said nozzle to a pressurized source of gas, said leader is ejected from said cassette.

2. A device according to claim 1, wherein said holder comprises a base portion having therein a channel extending in a direction substantially parallel to the longitudinal extent of said cassette, when on said holder, from a point adjacent said first-mentioned opening to an end face, as viewed in said direction, of said base portion.

3. A device according to claim 1, wherein there is provided a pair of nozzles, one on each side of said leader, and with orifices oriented so as to at least partially face each other.

4. A device according to claim 2, wherein said base portion has a top provided with an angled recess for accommodating the magnetic tape cassette, said recess corresponding to the contours of said cassette when in substantially vertical position on said holder, with said front wall facing downwardly, the channel in said base portion being open to the recess for admission of the nozzles as well as the ejected loop of leader tape.

5. A device according to claim 4, wherein the holder is dimensioned to simultaneously accommodate a plurality of magnetic tape cassettes in parallel juxtaposed relationship and is provided with a corresponding plurality of channels and nozzles or pairs of nozzles.

* * * * *